United States Patent [19]

Gosswiller et al.

[11] Patent Number: 4,595,904
[45] Date of Patent: Jun. 17, 1986

[54] WARNING LIGHT SYSTEM FOR EMERGENCY VEHICLES

[75] Inventors: Earl W. Gosswiller, Clarendon Hills; G. Thomas Ritter, Orland Park, both of Ill.

[73] Assignee: Federal Signal Corporation, Oak Brook, Ill.

[21] Appl. No.: 494,797

[22] Filed: May 16, 1983

[51] Int. Cl.⁴ .............................................. B60Q 1/00
[52] U.S. Cl. .................................. 340/87; 340/81 R; 340/84; 340/50; 350/99; 362/35
[58] Field of Search .................. 340/84, 87, 81 R, 50, 340/92; 362/170, 255, 35; 350/99; 318/466, 549

[56] References Cited

U.S. PATENT DOCUMENTS

| 2,264,013 | 11/1941 | Webb | 318/466 |
|---|---|---|---|
| 2,893,148 | 7/1959 | Figman | 362/255 |
| 2,959,761 | 11/1960 | Weber et al. | 340/87 |
| 3,404,371 | 10/1968 | Gosswiller | 340/87 |
| 3,551,740 | 12/1970 | Manners | 318/466 |
| 4,058,794 | 11/1977 | Menke | 318/466 |
| 4,189,709 | 2/1980 | Gosswiller | 340/84 |
| 4,240,062 | 12/1980 | Gosswiller | 340/84 |

Primary Examiner—John W. Caldwell, Sr.
Assistant Examiner—Jeffery A. Brier
Attorney, Agent, or Firm—Charles F. Pigott, Jr.

[57] ABSTRACT

A warning light system for emergency vehicles having a pair of forward rotating lights and a pair of rear rotating lights separated by a reflector structure. A cam and plunger arrangement causes the rotating light assemblies to stop at a predetermined position to serve as end lights in a secondary mode. The rotation of the light assemblies is synchronized to produce a series of inwardly moving flashes from each end of the housing.

19 Claims, 13 Drawing Figures

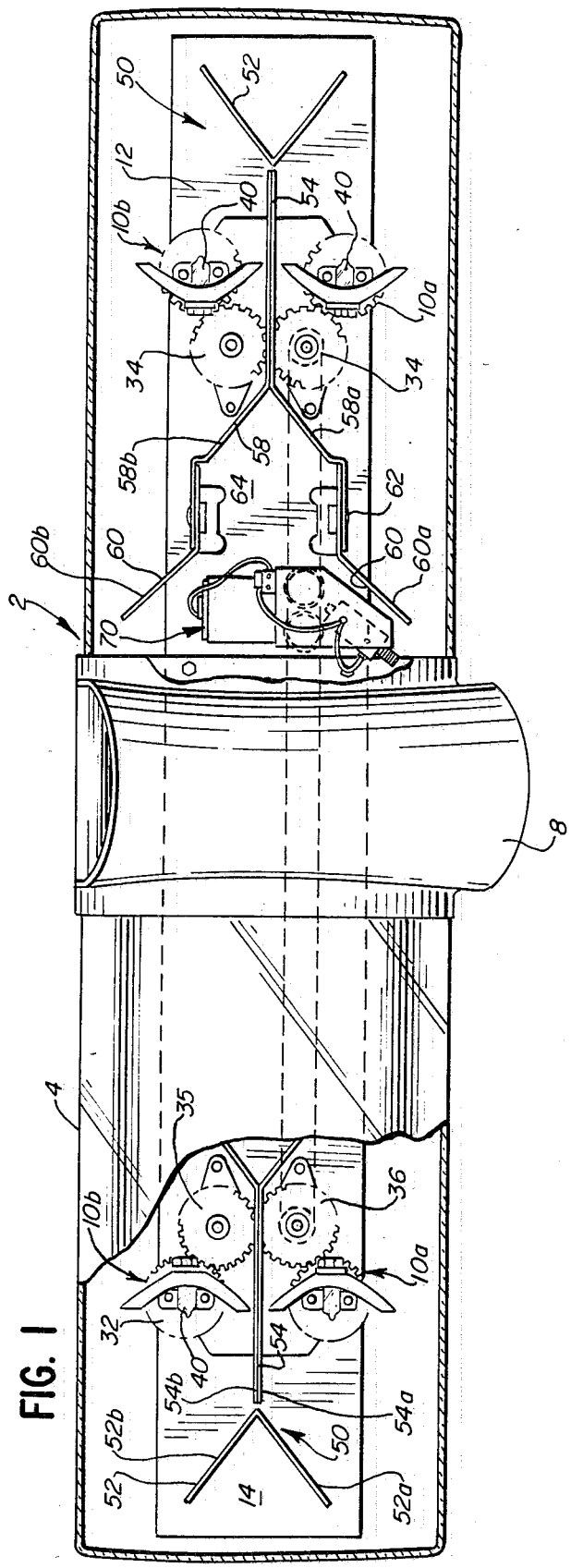
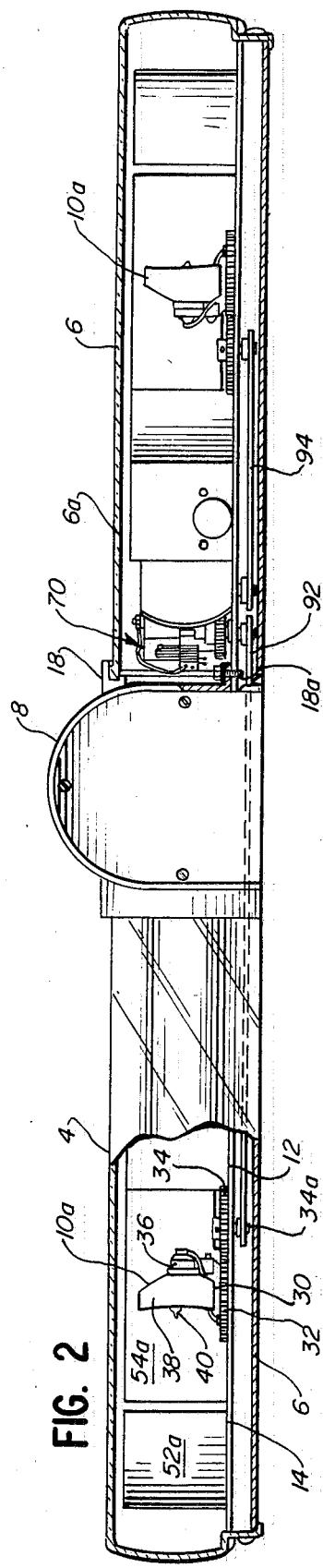
FIG. 1
FIG. 2

FIG. 9 is a detail side elevational view of a light socket for use in the system of FIG. 1;

FIG. 10 is a detail front elevational view of the light socket of FIG. 9;

FIG. 11 is a side elevational view of an alternative embodiment of the motor drive and control for rotating the light assemblies of the system of FIG. 1; and, FIG. 12 is a schematic diagram of a control circuit for controlling the motor drive and control of FIG. 11.

DESCRIPTION OF THE PREFERRED EMBODIMENT

Referring now to FIGS. 1 and 2, there is illustrated the warning light system for emergency vehicles of the invention, generally designated by reference numeral 2. The warning light system 2 of the specific embodiment shown is designed to be mounted on the roof of an emergency vehicle and is capable of providing a visual flash warning in all directions relative to the vehicle. The system 2 includes a housing 4 comprising a pair of globe compartments 6 arranged on opposite sides of a housing 8 in which a siren driver may be optionally mounted. The housing 4 is designed to be attached to the vehicle with its longitudinal axis generally extending laterally with suitable bracket means (not shown) elevating the housing above the vehicle roof line. Each of the globe compartments 6 is provided with a front light assembly 10a and a rear light assembly 10b.

The construction of globe compartments 6 is best shown in FIGS. 2 and 3. Each globe compartment 6 is formed with a one piece transparent globe wall 6a aerodynamically designed at its front and rear portions to reduce drag and having integral end walls. The globe wall 6a is attached to a metal extrusion 12 having an upper platform 14. The extrusion 12 serves as a base of the housing 4 and extends substantially its length. As best shown in FIG. 3, the extrusion may be interconnected with the globe wall 6a through a cooperating tongue and groove arrangement 16 provided on contacting edges of the globe 6a, and the front and rear edges of the extrusion 12.

The siren driver housing 8 includes mounting surfaces 18 on which the pair of globe compartments 6 may be supported. The inner edge portions of the pair of platforms 14 supported by the base extrusion 12 are affixed by screw assembly 18a to projections on the siren housing 8 as best shown in FIG. 2. The globe walls 6a are formed with a pair of bosses 20 positioned on the top and bottom thereof adjacent both the front and rear leading edges of the globe housing 6. The bosses 20 provide support posts against which one or more color inserts 22 may be readily inserted to provide an enhancing color for the flashing light as shown in FIG. 3. The use of inserts 22 facilitates installation and permits ready replacement as desired. A pair of elongated channels 24 are formed in the upper surface of the metal extrusion 12, one of which may serve as chain linkage compartments to permit interconnection of the drive means of the invention to the light assemblies as will be apparent. The globes or domes 6 must be removed from the base to install inserts. The inserts 22 are of any color and are slightly bowed and are in sections as shown in FIG. 3a. The gaps between adjacent sections allows clear light to show between the colored segments. In addition, end caps 23 may be attached to the ends of globe 8.

Referring now to FIGS. 1 and 2, the components of light assemblies 10a and 10b are illustrated. The construction of light assemblies 10a and 10b is identical, except that assembly 10a forms the forward lights and assembly 10b forms the rear lights in the globe compartments 6. The light assemblies 10a, 10b each include a base 30 which is affixed to the top of a gear 32 suitably journaled for rotation on platform 14. The base gear 32 of light assembly 10a is driven by a second gear 34 also mounted on the platform 14 for rotation. The second gear 34 includes a drive shaft portion 34a which extends beneath the platform for coupling to the drive means of the invention. An additional gear 35 is imposed between second gear 34 and the base gear 32 of light assembly 10b for simultaneous rotation of that light assembly in an opposite direction.

A light socket housing 36 is affixed to the top surface of base 30 of each light assembly 10a, 10b and is supported with a parabolic reflector 38 and a conventional light source 40, such as, for example, a halogen lamp or other similar lighting element. Optionally, similar light sockets (not shown) may be mounted on each side on base 30 in areas as will be described and respectively act as end illumination lights commonly known as "alley lights" and optional flashing strobe or steady burning incandescent lights known as "take down lights".

As shown in FIGS. 9 and 10, each of the sockets 36 has a bayonet socket design in which the lamp may rest at two possible positions so that its filament is aligned vertically or horizontally to attain the desired light beam pattern. This is accomplished through the use of a lamp having a pair of diametrically opposed bayonet or nobs lying in approximately the same plane as the axis of the filament. The nobs of the light may enter at point 41a in FIGS. 9 and 10 and twisted within the socket body to a rest position at either notches 41b or 41c which retains the nobs in engagement therewith. This aligns the filament either horizontally or vertically as desired.

The socket 36 enables the use of the same reflector assembly in any of the functional light assembly positions in the light bar housing 6. If the reflector is used as a rotating light, the lamp filament of the light bulb is oriented vertically. This gives a beam which has a relatively high vertical distribution and relatively narrow horizontal distribution (e.g., 10° Vertical×4° Horizontal); thus, the rotating light has, to the observer, a sharp, crisp flash due to its short duration. If, the same reflector assembly is used, for example, in the alley light position, the lamp filament would be aligned horizontally so the beam spread would be horizontally wide and vertically narrow. The degree to which filament orientation affects the beam spread and the actual effect is, of course, a function of the reflector design.

As will be apparent from the following description, the rotation of the light assembly 30 is preprogrammed and synchronized to provide a brilliant light signal during use. The flash patterns produced by the rotating assemblies 10a, 10b are optimized by a pair of reflector structures 50 which are respectively erected in the lighting domes 6 and extend from approximately siren housing 8 to a point near the outward ends of the domes 6. The reflector structures 50 include a plurality of reflective surfaces having a height greater than the height of the light assemblies 10a, 10b such that reflector structures 50 act as light barriers. By performing such a light blocking function, the light from light assemblies 10a is generally directed in an arc 180° forward of the vehicle during rotation, while the light from the rear assembly 10b is directed 180° in a rear direction. The combined rotation of both the forward and rear

WARNING LIGHT SYSTEM FOR EMERGENCY VEHICLES

BACKGROUND OF THE INVENTION

This invention relates in general to emergency vehicle systems and, more specifically, to an improved vehicle warning light system.

More specifically, but without specific restriction to the particular use which is shown and described, this invention relates to a vehicle warning system employing an array of light assemblies which are capable of optimum light enhancement or brightness. The light assemblies of the invention are controlled in a manner to produce superior flashing for emergency use and to be capable of being stopped at a predetermined angular orientation to produce a flashing or steady light output.

Known warning light systems for emergency vehicles typically employ a plurality of rotating lamp assemblies to create a desired flashing effect within a housing mounted on top of the vehicle. The warning system may also include a siren system and other lighting fixtures as accessories. An example of prior warning devices for emergency vehicles is disclosed in U.S. Pat. No. 3,404,371 to Gosswiller. In use, it is desirable that the flashing warning lights attain a 360° circle of illumination with maximum brightness. In some known warning systems, it is difficult to achieve an optimum flashing arrangement due to numerous problems. Effective lighting may be disrupted by structural components of the housing and lighting assemblies, the lack of proper control of light and reflective patterns, and improper design of globes for appropriate results under all lighting conditions.

In many emergency lighting systems, it is desirable that unidirectional warning lights and alley lights also be employed. The so-called warning lights are generally directed both to the front and to the rear of the vehicle and emit a unidirectional steady or flashing light that is useful in roadside and roadway situations. Known systems have required a separate warning light system from the rotating lamp assemblies used to create the warning flashes. The requirement for an additional lighting source in conjunction with the warning system increases expense of manufacture, operating costs and convenience of use. Conventional rotating light assemblies typically stop at any angular orientation with respect to their axis of rotation. Since the light from the stopped assembly may then be directed in any direction, known warning lights of this type are incapable of serving a selected function upon termination of rotation.

SUMMARY OF THE INVENTION

It is, therefore, an object of this invention to provide an improved vehicle warning light system.

It is a further object of the present invention to mount a plurality of rotating light assemblies mounted for synchronized rotation to direct light in a 360° circle.

A further object of the present invention is to mount a plurality of rotating light assemblies adjacent to a unique mirror arrangement for enhanced disbursement of light.

A still further object of the present invention is to provide an improved housing capable of exposing bright flashing lights even in daylight conditions.

Another object of this invention is to control the stopping position of rotating lights in conjunction with reflective surfaces to attain a steady or flashing front and/or back light illumination.

A further object of this invention is to provide means selectively to control power directed to one or more rotating lamp assemblies for the control of illumination thereof.

These and other objects are attained in accordance with the present invention wherein there is provided a vehicle warning light system employing a plurality of rotating light assemblies mounted adjacent a unique arrangement of reflective surfaces. One or more assemblies are mounted within a housing on the forward and rear sides of the reflective surfaces, such that one or more of the front assemblies directs light forward in a 180° pattern, and the rear light assemblies direct light in the same area to the rear. The light assemblies are capable of functioning in accordance with the reflective surfaces of the housing for superior enchancement of the flashes produced. Movement of the light assemblies of the system are synchronized with each other through a unique rotational drive system and may be stopped when desired at a fixed sideward position. The lights are then capable of operating in a secondary mode at which they serve as end lights directing light forward or rearward of the vehicle in a steady or flashing beam. Such dual modes permit the elimination of separate end lights which are often present in known warning light systems used in the past.

The system of the invention is provided with a unique housing in which color panels can be quickly mounted and replaced. The housing is provided with darkened upper dome areas for enhancement of the warning lights during bright daylight conditions. The light assemblies of the invention can further be controlled by deactivating power to selective units, such that illumination is, for example, limited to the rear of the vehicle, a feature useful in various traffic conditions.

DESCRIPTION OF THE DRAWINGS

Further objects of the invention, together with additional features contributing thereto and advantages accruing therefrom, will be apparent from the following description of a preferred embodiment of the invention, which is shown in the accompanying drawings with like reference numerals indicating corresponding parts throughout, wherein:

FIG. 1 is a top plan view, with parts in section, of the warning light system for emergency vehicles of the invention;

FIG. 2 is a front elevational view, with parts in section, of the system of FIG. 1;

Figure 3:
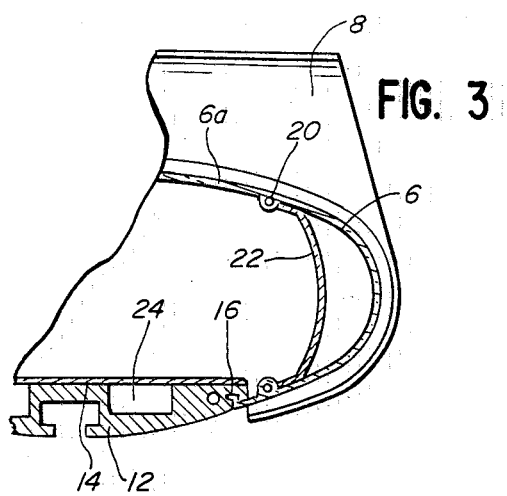
FIG. 3 is a partial transverse sectional view showing the structure of the housing of FIG. 1.

light assemblies 10a, 10b results in light being directed a full 360° when operating in conjunction with each other.

The left and right end sections of reflector structures 50 are in the form of a pair of V-shaped reflectors 52 having a forward surface 52a and a rear surface 52b. The surfaces 52a, 52b may comprise any suitable reflective materials, such as a polished aluminum mirror and the like. The V-shaped relfectors 52 are mounted adjacent a laterally extending mirror section 54, having a front reflective surface 54a and a rear reflective surface 54b, which separate the front and rear assemblies 10a, 10b. An inner V-shaped reflector 58 is integrally attached to the lateral mirror 54 and creates a pair of mirrored surfaces 58a, 58b having an angular orientation relative to reflective surfaces 54a and 54b. The optional end lights or alley lights may be mounted in the area 53 on each end of the housing within the V of the mirrors 52a, 52b. The optional strobe light may be mounted in areas 53' on each side of the housing approximately in front of mirror 52a.

The inner end portions of reflective structures 50 are formed with a fourth reflective panel 60 comprising panels which respectively extend angularly to the front and rear of the housing and create a fourth reflective surface 60a, 60b upon which light is directed during rotation of the light assemblies 10a, 10b and reflect light in a forward direction. Light to the side of the light is directly reflected from reflectors 10a and 10b. Because the lights 40 are synchronized to be directed to the end of the bar at the same time, the effect is a full flash. The inner reflective panel 60 is separated laterally inward from the V-shaped reflector 58 by a wall 62 which can be used to create a compartment 64 and 64a capable of respectively receiving a strobe power supply and a siren amplifer (both not shown). The reflective structure 50 also acts as a convenient enclosure of the light drive assembly.

In the primary mode of operation, rotation of the light sources 40 is synchronized in a manner that the flashes move inward from each end of the globe housing 6 in both the front and rear. During rotation of the lamp assemblies 10a, 10b, four distinct flashes are produced by each light off of mirrored surfaces 52a, 52b; 58a, 58b; 60a, 60b; and by the light source 40 itself. Although any rotational rate providing suitably intense flashes may be selected in accordance with the invention, it is found that a rotation rate of approximately 70 rpm is hightly effective in use of the system herein disclosed. Because of the presence of the novel reflector structure 50 in each lighting dome compartment 6, rotation of the front light assemblies 10a produces flashes over a 180° semi-circle to the front, while the rear lights produce flashes over a 180° semi-circle to the rear.

Referring now to FIGS. 1, 2, 4, 5 and 6, there is illustrated the synchronized drive mechanism 70 for causing rotation of the four light assemblies 10a, 10b. The drive mechanism 70 includes an electric motor 72 which is operated from the power source driving the lamps 40 and is carried on the base of U-frame 74 having a leg 74a with a greater length than leg 74b. The output of electric motor 72 is produced by a conventional worm gear 76. The worm gear 76 meshes with a gear 78 suitably affixed in a conventional manner on a drive shaft 80 journaled between legs 74a, 84b on the frame 74. An intermediate gear 82 is supported on the shaft 80 and meshes with a second similar gear 84, which is mounted on a shaft 86 rotatably mounted on frame 74 in parallel relationship to shaft 80.

Rotation of the worm gear 76 causes rotation of both shafts 80 and 86 through gears 82 and 84. The ends of shafts 80 and 86 are provided with respective chain sprockets 88 and 90. Both of the chain sprockets 88 and 90 are interconnected by chains 92, 94 with a respective gear assembly 34 associated with each front light assembly 10a. (FIG. 2). The chains 92, 94 thus effect synchronous rotation of both light assemblies 10a, 10b through gears 34 and 35.

The warning light system of the invention is further capable of providing a secondary mode of operation in which a steady or flashing light may be directed to the rear and to the front of the vehicle, while the light assemblies are disposed in the fixed stationary position shown in FIG. 1. The provision of a secondary mode of operation of the present invention eliminates the necessity of providing separate end lights in the warning light system. The light assemblies 10a, 10b are capable of such a second function through the operation of a solenoid assembly 100.

Figure 8:
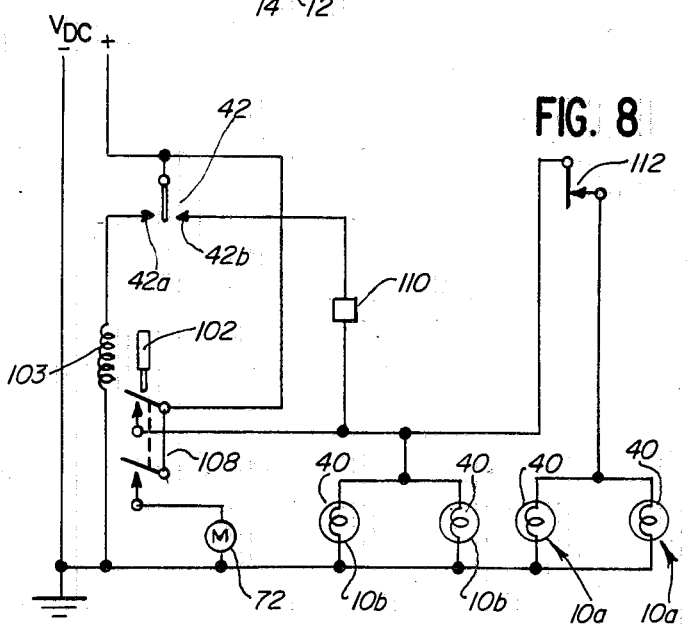
FIG. 8 is a schematic diagram of the light control circuit for the system of FIG. 1.
Figure 7:
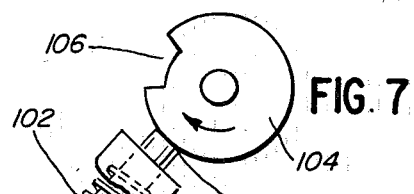
FIG. 7 is a detail top plan view of the solenoid plunger and cam associated with the drive assembly of FIG. 4.
Figure 6:
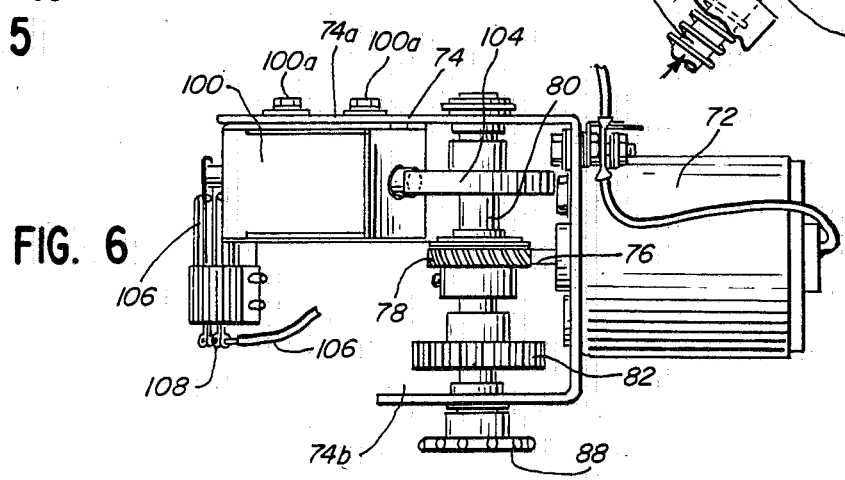
FIG. 6 is a side elevational view of the drive assembly of FIG. 4.
Figure 9:
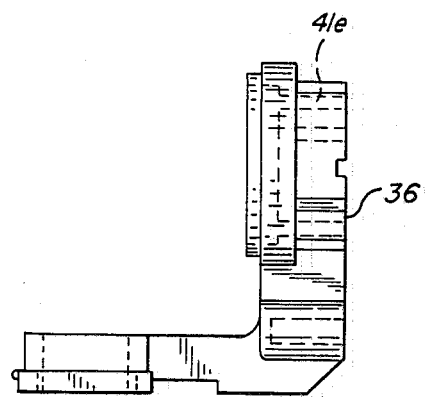
Figure 10:
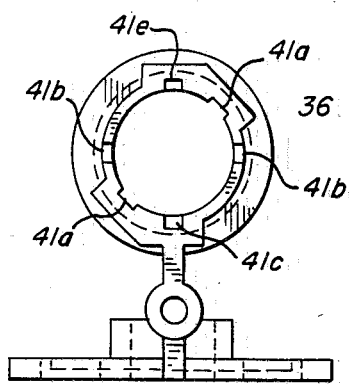
Figure 3A:
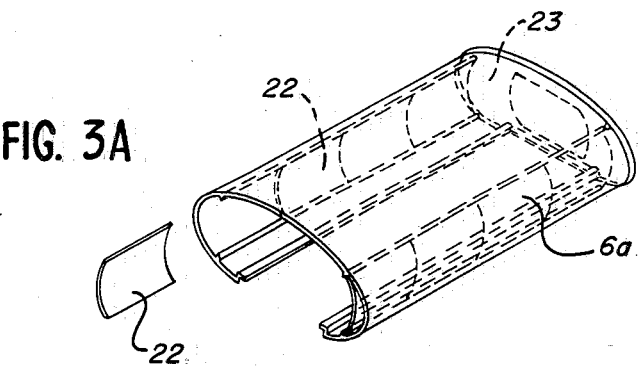
FIG. 3A is a detail perspective view of a plurality of color inserts mounted in the light domes of the system of FIG. 1.

The solenoid assembly 100 is provided with an outer housing attached by screw assemblies 100a to the leg 74a of frame 74. An elongated plunger 102 in the form of an armature is spring-biased inward toward shaft 80 by a spring 102' as shown in FIG. 7. A cam 104, having the shape such as shown in FIG. 7, is mounted on shaft 80 for rotation therewith and is in general alignment with the end 102a of the armature of the solenoid assembly 100. As depicted in FIG. 8, the solenoid assembly 100 includes a solenoid 103 operatively positioned relative to armature 102. When the solenoid 103 is not energized, the spring 102' will cause movement of the plunger inward against the periphery of the rotating cam 104 until the end engages a slot 106 provided in the cam to prevent rotation of the shaft 80. The plunger 102 is maintained in a position away from an engagement with slot 106, when solenoid 103 associated with the armature 102 is energized during rotation of the light assemblies in the primary mode.

Referring to FIG. 8, there is illustrated the electric circuit controlling operation of the warning lights of the invention. The light assemblies 10a, 10b are operated by switch 42, having a center-off position. When the contact 42a of switch 42 is closed, power is supplied from the D.C. battery and the like to light sources 40, solenoid 103 and drive motor 72. This produces the primary mode of operation in which the activated light assemblies 10a, 10b are rotated in synchronization by motor 72. In the primary mode, the solenoid 103 pulls the plunger 102 from slot 106 and prevents the plunger 102 from being biased against cam 104.

To arrest rotation of the light sources and commence the secondary mode of operation, the switch 42 is opened in its center position. The solenoid 103 is then de-energized, and the armature 102 is resiliently urged against the cam 104. The circuit maintains current to the drive motor 72 to rotate cam 104 until the plunger 102 moves into engagement with slot 106. A switch assembly 108 is connected to the outer end of the plunger 102 and disables the electric motor 72 and switches off the light sources 40 upon inward movement of the plunger 102 by opening the circuit. In the secondary mode, power may be returned to the light sources 40 by closing contact 42b, while rotation is stopped. The cam and plunger arrangement causes the light sources 40 to be directed at a fixed pre-established position which is shown in FIG. 1. Light then is caused to be directed to the front and the rear against reflective surfaces 52a and 52b and acts as an end light.

A conventional flasher 110 may optionally be provided in the circuit to cause the light to undergo a steady flashing effect in the secondary mode of operation with switch contact 42b closed. The circuit further includes a switch 112 to interrupt power to the front light assemblies 10a, while isolating light to the rear assemblies 10b. This feature is advantageous in roadside emergency situations to prevent distractions of oncoming motorists.

The warning light system of the invention permits rotating light output at 90° to the longitudinal axis of the vehicle, even if alley lights are mounted within the V-shaped mirrors 52. An approach light in the form of a strobe or steady burning incandescent lamp may readily replace mirror 52a if desired. The rear light assemblies 10b are also capable of being removed when the warning light system is mounted on the front of an ambulance and the like, in which case light is directed in a 180° semi-circle.

Figure 4:
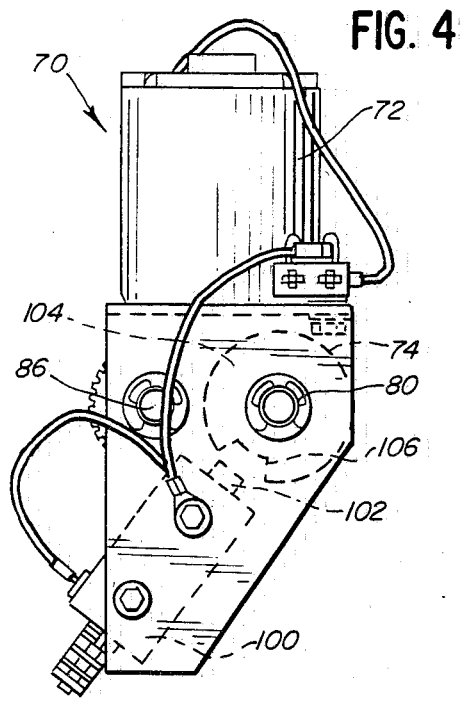
FIG. 4 is a top plan view of the drive assembly of the system of FIG. 1.
Figure 5:
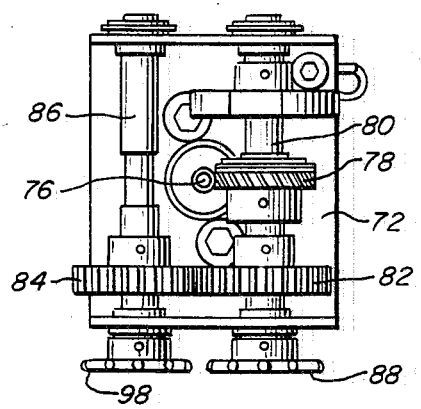
FIG. 5 is a front elevational view of the drive assembly of FIG. 4.
Figure 11:
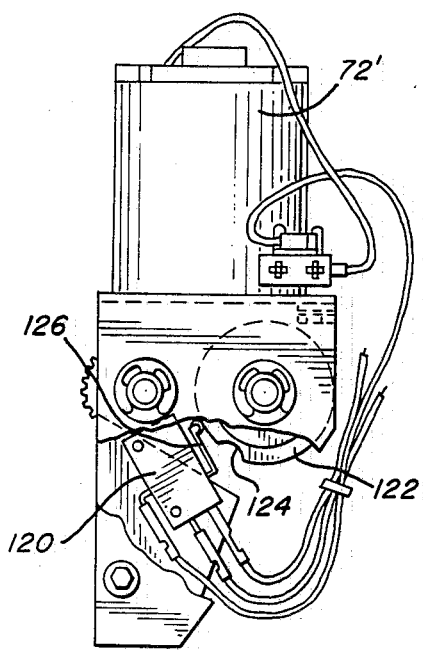
Figure 12:
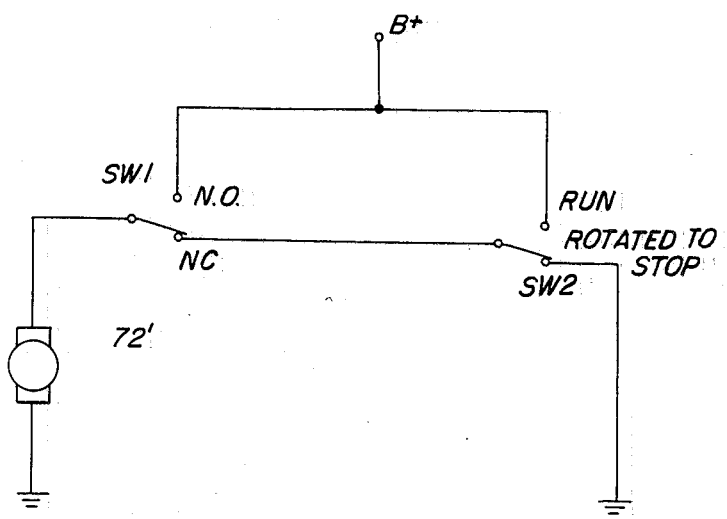

Referring now to FIG. 11, there is illustrated a second embodiment of the motor drive for rotating light assemblies 30 of the system of FIG. 1. The structure of the motor and frame are similar to the motor and drive of FIGS. 4 and 5 with the exception that the solenoid and plunger 100 has been replaced by a microswitch 120 which is caused to continuously switch between contacts NO and NC by rotation of a disc 122 having a notch 124 and driven by shaft 80 such as shown in FIG. 5. The notch 124 acts to contact cam switch element 126 of microswitch 120 to cause switch contact between points NO and NC. Besides this foregoing change, the conventional electric motor and gears shown in FIGS. 4 and 5 are likewise utilized in the embodiment of FIG. 11 to cause rotation of the light assemblies 30 in a manner previously described. The operation of the motor 72' to control its rotation is illustrated in FIG. 12. When the switch SW 2, the on/off switch at vehicle console, is in the "run" position, SW1, the cam microswitch created by notch 124 and contact 126, will move back and forth because of dynamic braking. If the switch SW2 is moved to the "rotate to stop" position and the "NO" contacts of the microswitch are closed, the motor will continue to run until the cam disc 122 is rotated to the position where the cam switch element 126 will move to the "NC" position as caused by the notch 124 and dynamic braking of the motor 72' will occur in a manner that a predetermined stopping position of the light assemblies 30 for the purpose previously described is attained. Control of the activation of the lights for flashing effects can be provided by other circuitry (not shown) and used in conjunction with the basic rotational control circuit of FIG. 12 or similar circuit.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A warning light system for emergency vehicles comprising:

housing means having transparent portions and being adapted to be attached to a vehicle, a plurality of light assemblies mounted within said housing means for creating illumination through said transparent panels, at least one of said light assemblies having a light source arranged to be coupled to a source of electrical power and being mounted for rotation about a generally vertical axis, drive means for rotating said light assemblies mounted for rotation, reflective means mounted in said housing means adjacent said light assemblies mounted for rotation, said reflective means cooperating with said rotating light source to produce a plurality of flashes of light through said transparent panels during each rotation thereof, and said drive means including a rotatable shaft mechanically coupled to said at least one light assembly whereby said light assembly rotates with said shaft, a motor driving said rotatable shaft, said shaft having an axis and carrying a cam disk in normal relation to the shaft axis, said cam disk defining a peripheral slot, plunger means positioned to engage the periphery of the cam disk as the cam disk rotates, said plunger means being resiliently biased to press against said cam disk and to enter said slot to lock said cam disk and one light assembly into one rotational position when the cam disk rotates to pass the slot by the plunger means, switch means for deactivating said motor when the plunger means enters said slot, and means for retracting said plunger means from the slot to cause activation of said motor and to permit said cam disk and shaft to rotate.

2. The system according to claim 1 wherein said cam disk and plunger are positioned to stop said light source at a position to direct its light generally to the front or rear of the vehicle.

3. The system according to claim 2 wherein said reflective means includes a plurality of first reflective surfaces, said first reflective surfaces being arranged to reflect light from said light source in said one rotational position in a generally forward or rearward direction.

4. The system according to claim 1 wherein said plurality of light assemblies include at least one pair of rotating light assemblies having respective light sources, said at least one pair of rotating light assemblies being separated to create a forward and rearward section of said housing means, said reflective means having a plurality of reflective surfaces arranged to reflect the light beams from each of said light sources over an extent of 180° arc in respective directions forward and rearward of the vehicle.

5. The system according to claim 4 further including circuit means having switch means for ceasing electrical power to a selected one of said light sources and maintaining the supply of power to others of said light sources.

6. The system according to claim 1 wherein said at least one light assembly includes a reflector mounted adjacent said light source for orbital rotation about the axis of rotation thereof.

7. The system according to claim 3 wherein said light source directs light generally laterally of the vehicle in said stationary position, said first reflective surfaces reflecting said light generally forward or rearward of the vehicle.

8. The system according to claim 1 wherein said housing means includes retention means for receiving and retaining transparent color panels adjacent said transparent portions of said housing means.

9. A warning light system for emergency vehicles comprising:
- housing means adapted to be attached to an emergency vehicle and having transparent sections and at least one light assembly mounted for rotary movement along a generally vertical axis,
- drive means for rotating said light assembly about said axis,
- said light assembly including a light source and a reflector mounted adjacent thereto, said light source and said reflector acting to move with said light assembly and direct flashes of light through said transparent sections,
- control means coupled to said drive means for controlling operation of said drive means to rotate said light assembly,
- said control means having circuit means to deactivate said drive means for stopping said rotation and said control means further having means to cause said light assembly to assume a predetermined angular position, and
- said drive means and control means including a rotatable shaft mechanically coupled to at least one light assembly whereby said light assembly rotates with said shaft, said drive means including a motor driving said rotatable shaft, said shaft having an axis and carrying a cam disk in normal relation to the shaft axis, said cam disk defining a peripheral slot, plunger means positioned to engage the periphery of the cam disk as the cam disk rotates, said plunger means being resiliently biased to press against said cam disk and to enter said slot to lock said cam disk and the light assembly into one rotational position when the cam disk rotates to pass the slot by the plunger means, switch means for deactivating said motor when the plunger means enters said slot, and means for retracting said plunger means from the slot to cause activation of said motor and to permit said cam disk and shaft to rotate.

10. The warning light system of claim 9 further including reflective means mounted adjacent said light assembly, said reflective means adapted to direct light either forwardly or rearwardly of the vehicle in said one rotational position of said light assembly.

11. A warning light system for an emergency vehicle comprising:
- housing means having a transparent dome portion and being arranged to be attached to a vehicle,
- a plurality of light assemblies mounted for rotation about a generally vertical axis, said light assemblies having a light source and a reflector,
- drive means coupled to each of said light assemblies to drive said light assemblies including said light source and said reflector in approximate synchronization to each other, and
- said drive means including a rotatable shaft mechanically coupled to said light assemblies, whereby said light assemblies rotate with said shaft, a motor driving said rotatable shaft, said shaft having an axis and carrying a cam disk in normal relation to the shaft axis, said cam disk defining a peripheral slot, plunger means positioned to engage the periphery of the cam disk as the cam disk rotates, whereby said plunger means may be pressed against said cam disk to enter said slot to lock said cam disk and light assemblies into one rotational position when the cam disk rotates to pass the slot by the plunger means.

12. The system according to claim 11 wherein said light assemblies are mounted on a rotatable gear platform, a rotatably mounted drive gear coupled to each of said rotatable gear platforms.

13. The system according to claim 12 wherein said drive means includes an endless chain.

14. A vehicle warning light housing assembly for mounting across the roof of an emergency vehicle, the improvement comprising, in combination, base means, at least one elongated transparent dome means mounted on the top of said base means, said transparent dome means being curved in cross section to form a top portion and integral front and rear side portions, a pair of longitudinal rib means formed integrally inside at least one of said front and rear side portions, one rib of said pair of longitudinal rib means being disposed along an upper end of said one side portion and the other rib of said pair of longitudinal rib means being disposed along a lower end of said one side portion, and at least one colored insert panel having upper and lower longitudinal edge portions for engagement with corresponding ones of said pair of longitudinal rib means whereby said insert panel may be inserted inside of said dome member adjacent said one side portion thereof and mounted between said pair of longitudinal rib means.

15. A vehicle warning light housing assembly as defined in claim 14 where a plurality of colored inserts of different colors are mounted in said one side of said transparent dome member.

16. A vehicle warning light housing assembly as defined in claim 14 where a pair of longitudinal rib means is formed integrally on both said front and rear side portions of said transparent dome member, and at least one of said colored insert panels is mounted inside of said transparent dome member adjacent both said front and rear side portions of said dome member.

17. A vehicle warning light housing assembly as defined in claim 14 where said colored insert panel is flexible and is mounted by bowing it and sliding it between said pair of longitudinal rib means, said insert panel when mounted having less curvature than the adjacent side of said dome member and being spaced from the latter.

18. A warning light assembly for mounting on the roof of an emergency vehicle, the improvement comprising, in combination, a plurality of rotatable warning lights, at least one of said rotatable warning lights being associated with control means which enables said rotatable warning light to be used in a rotating mode or to be stopped in a predetermined position for use as a fixed warning light, and said rotatable warning light including a light bulb having a filament, and a socket for mounting said light bulb, said socket having means for mounting said light bulb in a selected one of two positions so in one position said filament is vertical and in another position said filament is horizontal, whereby said filament may be oriented vertically when said rotatable light is used in said rotating mode and may be oriented horizontally when said rotatable light is used as a fixed warning light.

19. A warning light assembly as defined in claim 18 where said socket comprises a bayonet socket and said light bulb has bayonet projections thereon whereby upon insertion of said light bulb into said bayonet socket said light bulb may be twisted to a selected one of two positions depending upon whether it is desired to orient said filament vertically or horizontally.

* * * * *